(12) United States Patent
Zhang

(10) Patent No.: US 7,764,332 B2
(45) Date of Patent: Jul. 27, 2010

(54) LIQUID CRYSTAL DISPLAY HAVING CONNECTING MEMBER FOR PUSH BUTTON ARRAY

(75) Inventor: Xiang Zhang, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 700 days.

(21) Appl. No.: 11/642,074

(22) Filed: Dec. 20, 2006

(65) Prior Publication Data

US 2007/0139579 A1 Jun. 21, 2007

(30) Foreign Application Priority Data

Dec. 21, 2005 (CN) .......................... 2005 1 0121042

(51) Int. Cl.
*G02F 1/1333* (2006.01)
*H04N 5/64* (2006.01)

(52) U.S. Cl. ...................... 349/58; 349/59; 361/679.21; 361/679.22; 348/794

(58) Field of Classification Search .................... 349/58, 349/59; 361/679.21, 679.22, 679.24; 348/794
See application file for complete search history.

(56) References Cited

U.S. PATENT DOCUMENTS

| 5,119,204 | A | * | 6/1992 | Hashimoto et al. .......... 348/794 |
| 5,134,505 | A | | 7/1992 | Tanaka et al. |
| 6,922,218 | B2 | | 7/2005 | Ju |
| 2002/0126248 | A1 | * | 9/2002 | Yoshida ...................... 349/149 |
| 2006/0002063 | A1 | * | 1/2006 | Nishida ...................... 361/681 |

FOREIGN PATENT DOCUMENTS

TW 200528837 A 9/2005

* cited by examiner

*Primary Examiner*—Michael H Caley
(74) *Attorney, Agent, or Firm*—Wei Te Chung

(57) ABSTRACT

An exemplary liquid crystal display (2) includes a display panel (220), a shield (240), a connecting member (250), and a button circuit board (262). The display has a side wall (227). The shield is engaged with the display panel, and a size of the shield is smaller than a corresponding size of the display panel. One end of the connecting member is attached at the shield. The button circuit board is attached at an opposite end of the connecting member and abuts the side wall of the display panel.

20 Claims, 6 Drawing Sheets

LIQUID CRYSTAL DISPLAY HAVING CONNECTING MEMBER FOR PUSH BUTTON ARRAY

FIELD OF THE INVENTION

The present invention relates to liquid crystal displays with push buttons located at a shield thereof, and more particularly to a liquid crystal display having a push button attached at a connecting member of a shield.

BACKGROUND

A common kind of liquid crystal display includes a frame, a display panel, and a main circuit board. A button circuit board includes a plurality of push buttons, which may for example be located in the frame below the display panel. The push buttons connect with a button circuit board inside the frame. In turn, the button circuit board is connected to the main circuit board. The push buttons are provided for users to adjust the characteristics of images shown on the display panel, such as brightness, contrast ratio etc.

Referring to FIG. 5, this shows an exploded, back view of main parts of a conventional liquid crystal display 1. The liquid crystal display 1 includes a frame 110, a display panel 120, a button-member 160, and a shield 140. A main circuit board (not visible) is electrically connected to the display panel 120 and the button member 160 by flexible printed circuit boards (not shown) respectively. A size of the shield 140 is substantially equal to that of the display panel 120. The shield 140 engages with the display panel 120, which cooperatively receive the main circuit board therebetween. The shield 140 provides screening to reduce electro-magnetic interference occurring in the main circuit board.

The frame 110 includes a plurality of through holes 112 in a lower beam thereof. An indicating light 114 is provided in the lower beam beside the through holes 112. The indicating light 114 shows a current state of the liquid crystal display 1. The button member 160 includes a button circuit board 162, a plurality of push buttons 164 disposed on the button circuit board 162, two screws 161, and two holes 163. The characteristics of images shown on the display panel 120 can be adjusted via the push buttons 164.

The shield 140 is made by molding a rectangular conductive metal plate, and includes a base 141, a first sidewall 142, a second sidewall 143, a third sidewall 144, and a fourth sidewall 145. The base 141 and the first, second, third, and fourth sidewalls 142, 143, 144, 145 cooperatively form a first receiving space (not labeled). A central protruding part 146 extends rearward from the base 141. A second receiving space (not labeled) is defined in the protruding part 146, and the main circuit board is received in the second receiving space.

Referring also to FIG. 6, this is an enlarged, isometric view of the shield 140. The fourth side wall 145 of the shield 140 includes a flange 147 bent downward from a middle portion of a main body thereof. The flange 147 is substantially perpendicular to the main body of the fourth side wall 145. The flange 147 includes two protrusions 148. Each protrusion 148 has a fixing hole 149 positioned corresponding to the hole 163 of the button circuit board 162 respectively.

When assembling the liquid crystal display 1, firstly, the display panel 120 and the circuit board are received in the first and second receiving spaces respectively. Then, the button member 160 is attached at the flange 147, with the protrusions 148 extending though the holes 163 respectively. Secondly, the button member 160 is fixed at the flange 147 by the screws 161 engaging in the fixing holes 149. Finally, the display panel 120 and the shield 140 are engaged together with the frame 110 then, received therebetween. In this position, the push buttons 164 protrude through the through holes 112.

The size of the shield 140 is substantially equal to that of the display panel 120, therefore the button member 160 needs to be located at a bottom side of the shield 140 at the flange 147. This means the liquid crystal display 1 is relatively large and heavy, and correspondingly costly.

Accordingly, what is needed is a shield of a liquid crystal display configured to overcome the above-described problems.

SUMMARY

An exemplary liquid crystal display includes a display panel, a shield, a connecting member, and a button circuit board. The display has a side wall. The shield is engaged with the display panel, and a size of the shield is smaller than a corresponding size of the display panel. One end of the connecting member is attached at the shield. The button circuit board is attached at an opposite end of the connecting member and abuts the side wall of the display panel.

A detailed description of embodiments of the present invention is given below with reference to the accompanying drawings.

BRIEF DESCRIPTION OF THE DRAWINGS

In the drawings, all the views are schematic.

DETAILED DESCRIPTION OF PREFERRED EMBODIMENTS

Figure 1:
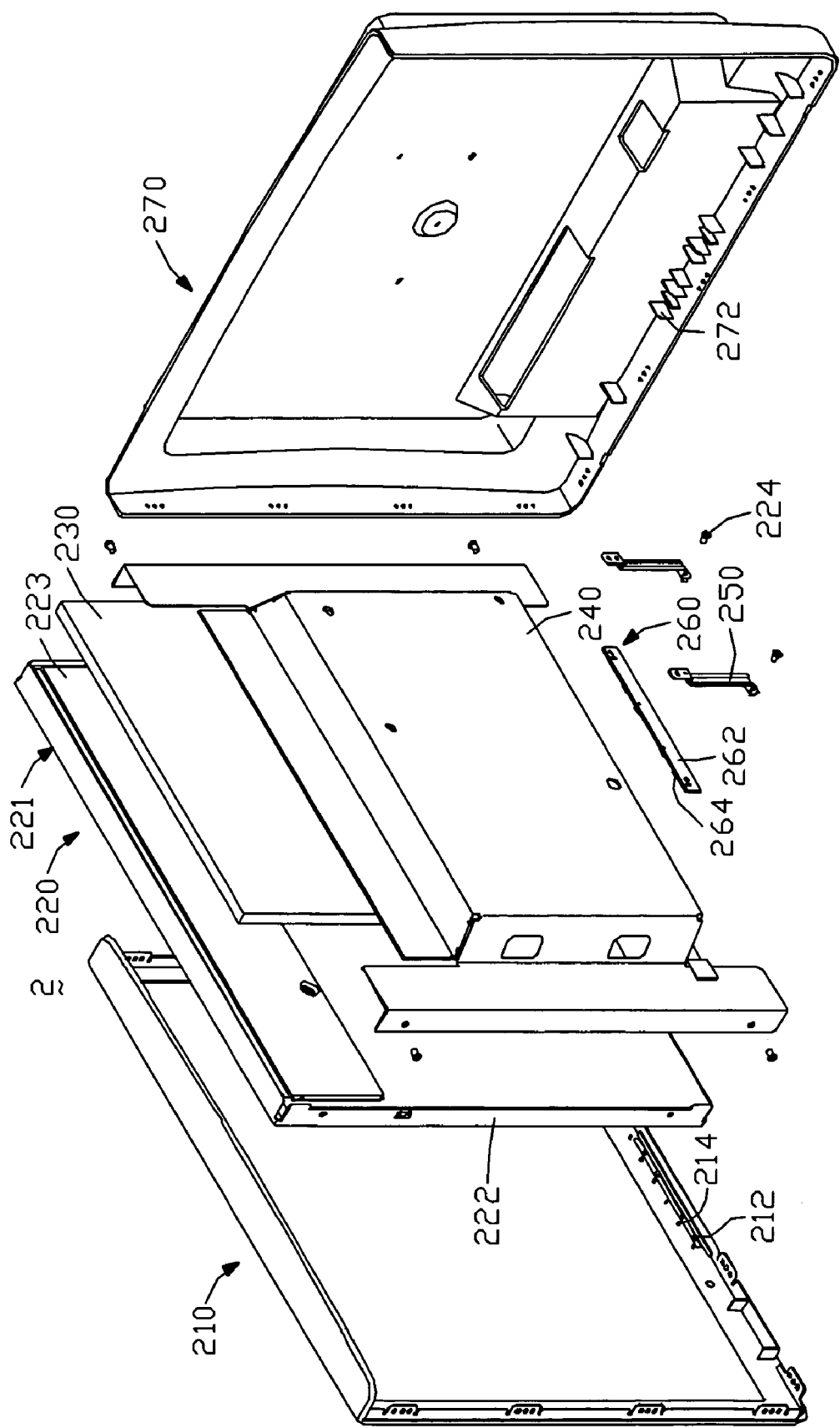
FIG. 1 is an exploded, back view of main parts of a liquid crystal display in accordance with a first embodiment of the present invention.

Referring to FIG. 1, this is an exploded, back view of main parts of a liquid crystal display 2 in accordance with a first embodiment of the present invention. The liquid crystal display 2 includes a front frame 210, a display panel 220, a main circuit board 230, a shield 240, a rear frame 270, a button member 260, and two connecting members 250. The display panel 220 is surrounded by a conductive cover 222 made of metal. The display panel 220 includes a display surface 221, a back surface 223 opposite and parallel to the display surface 221, and a side wall 227. A size of the shield 240 is smaller than that of the display panel 220.

The main circuit board 230 is electrically connected to the display panel 220 and the button member 260 by flexible printed circuit boards (not shown) respectively. The shield 240 is made by molding a rectangular conductive metal plate, has a receiving space receiving the main circuit board 230 therein, and is engaged with the display panel 220. The connecting members 250 are attached at the shield 240 and abut the cover 222 at the side wall 227 of the display panel 220. The shield 240 and the cover 222 together provide the main circuit board 230 and the display panel 220 with a screening effect for reducing the electromagnetic. The front and rear frames 210, 270 are engaged together, and cooperatively receive the display panel 240, the main circuit board 230, and the shield 240 therebetween.

A lower part of the front frame 210 includes a plurality of through holes 212, a plurality of protrusions 214, and a first ridge 216. The protrusions 214 and the first ridge 216 are substantially perpendicular to the front frame 210, and located above and beneath the through holes 212 respectively. The rear frame 270 includes a plurality of second ridges 272 substantially perpendicular to a main wall thereof. The second ridges 272 are positioned corresponding to the protrusions 214 and the first ridge 216.

The button member 260 includes a button circuit board 262, and a plurality of push buttons 264 formed on the button circuit board 262. The connecting members 250 each include a screw 224.

Figure 2:
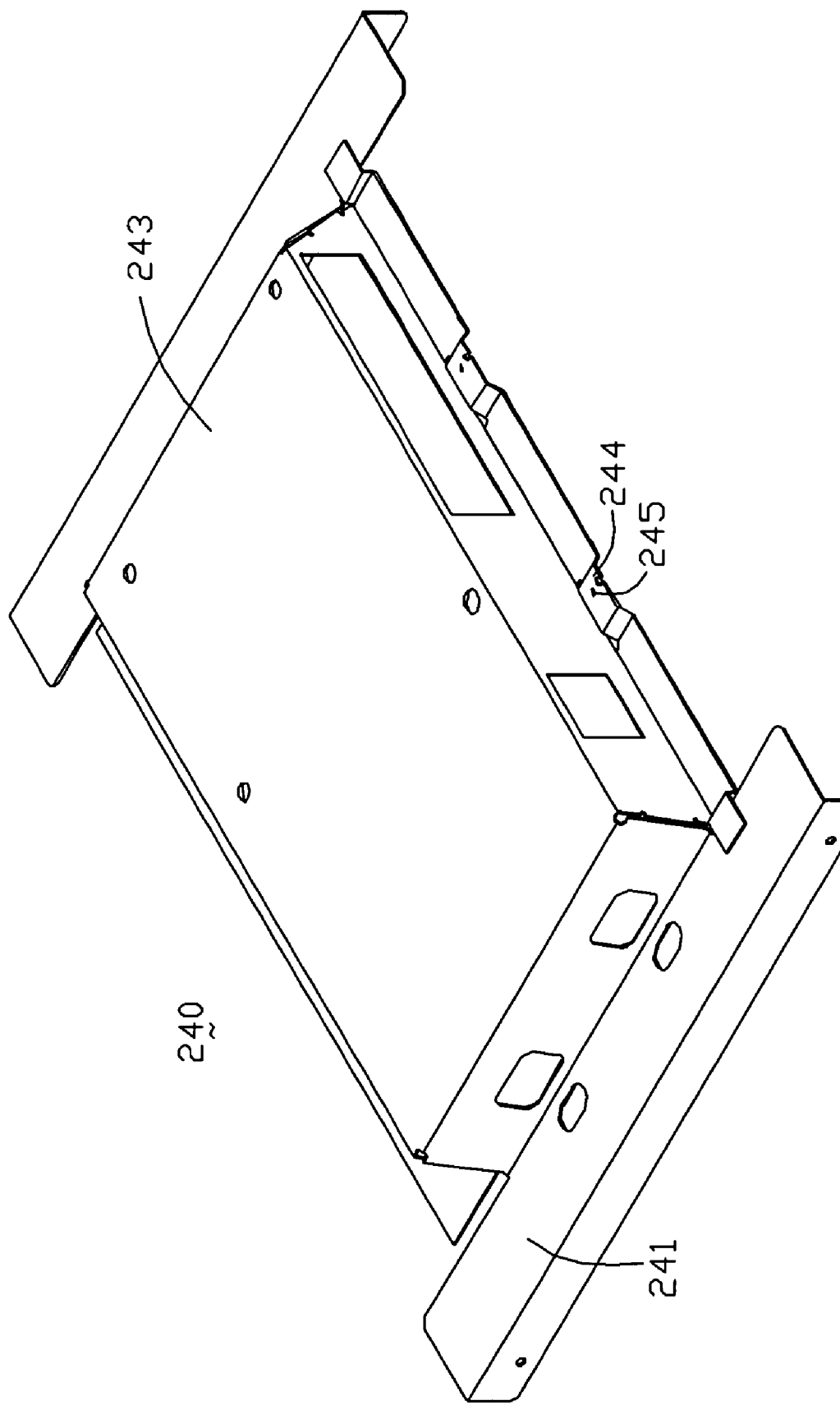
FIG. 2 is an enlarged, isometric view of a shield of the liquid crystal display of FIG. 1.

Referring to FIG. 2, this shows an isometric view of the shield 240. The shield 240 includes a base 241 with a rectangular protruding part 243. The protruding part 243 defines a receiving space, which receives the main circuit board 230 therein. Two bridge portions 244 are formed on the shield 240 below the protruding part 243. Each bridge portion 244 has a fixing hole 245.

Figure 3:
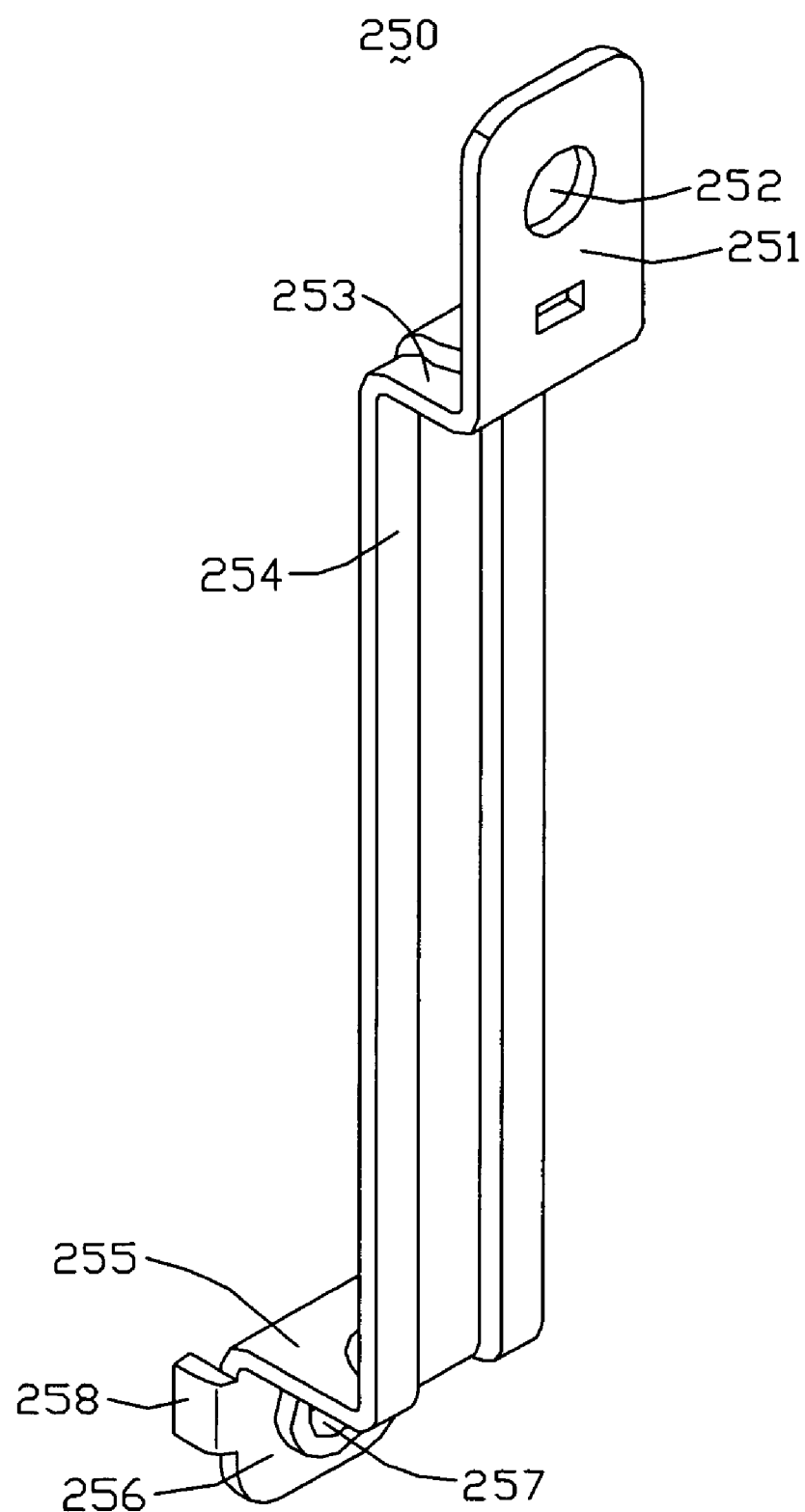
FIG. 3 is an enlarged view of one of connecting members of the liquid crystal display of FIG. 1.

Referring to FIG. 3, this is an enlarged view of one of the connecting members 250. The connecting member 250 is made by bending a strip-shaped piece of conductive metal, and includes a first end portion 251, a first bending part 253, a main body 254, a second bending part 255, and a second end portion 256. The first and second end portions 251, 256 are connected to the main body 254 by the first and second bending parts 253, 255 respectively. A first fixing hole 252 and a second fixing hole 257 are formed at the first and second end portions 251, 256 respectively. A side part 258 at the second end portion 256 is bent forward from an edge of a main part of the second end portion 256, and substantially perpendicular to the main part of the second end portion 256. The side parts 258 of the connecting members 250 (shown in FIG. 2) are arranged symmetrically opposite each other.

Figure 4:
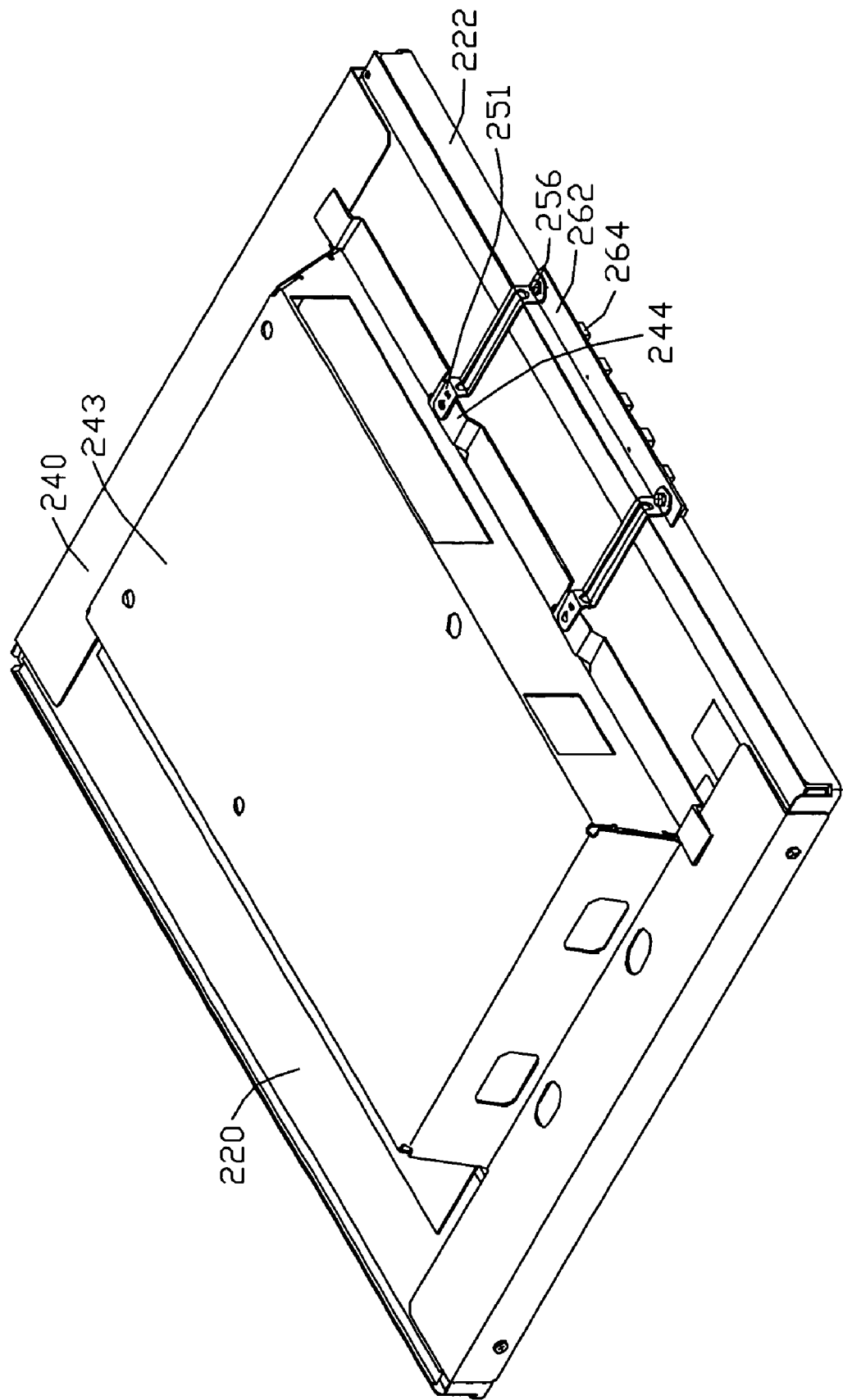
FIG. 4 is an isometric view of the liquid crystal display of FIG. 1 fully assembled.
Figure 5:
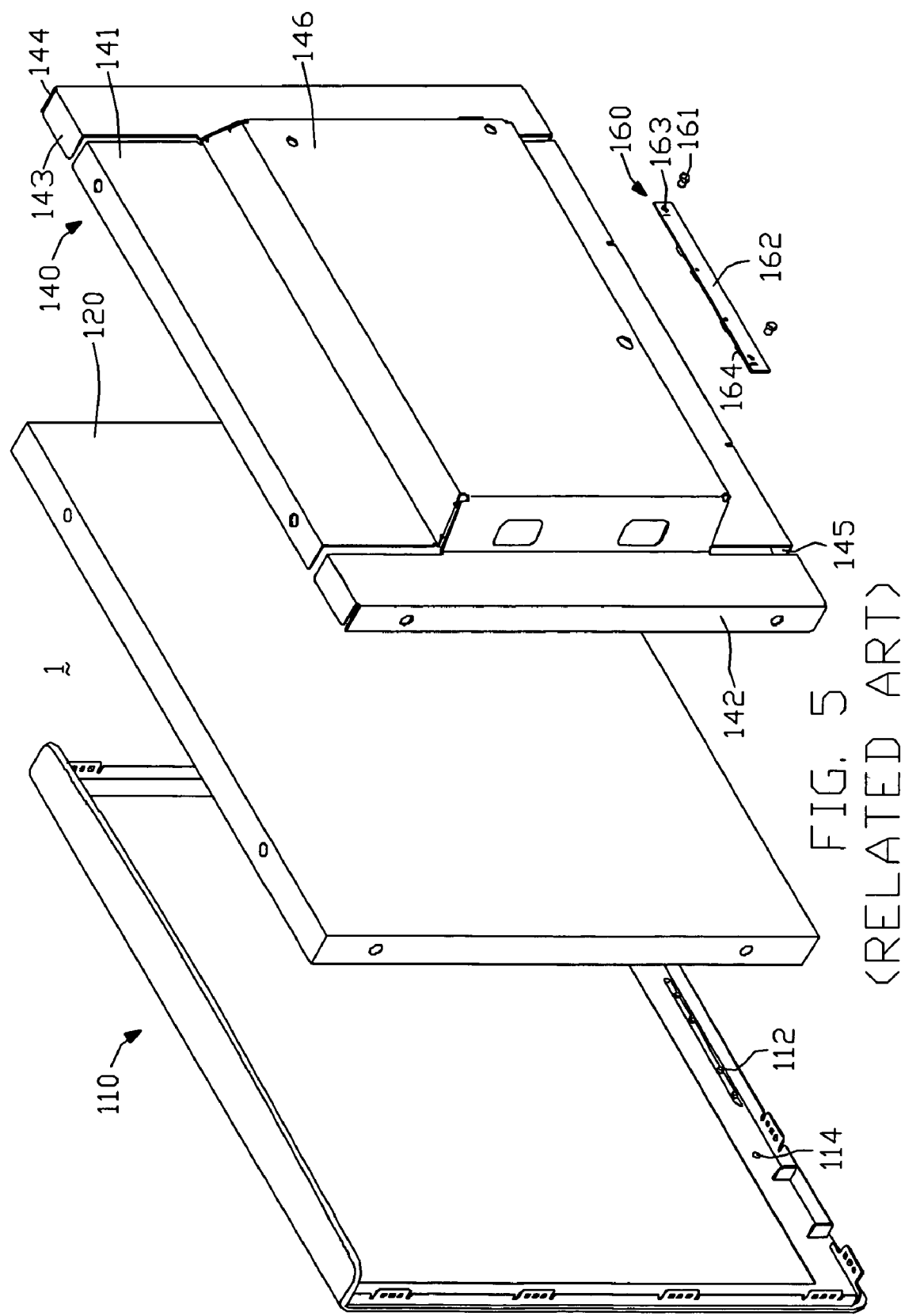
FIG. 5 is an exploded, back view of main parts of a conventional liquid crystal display.
Figure 6:
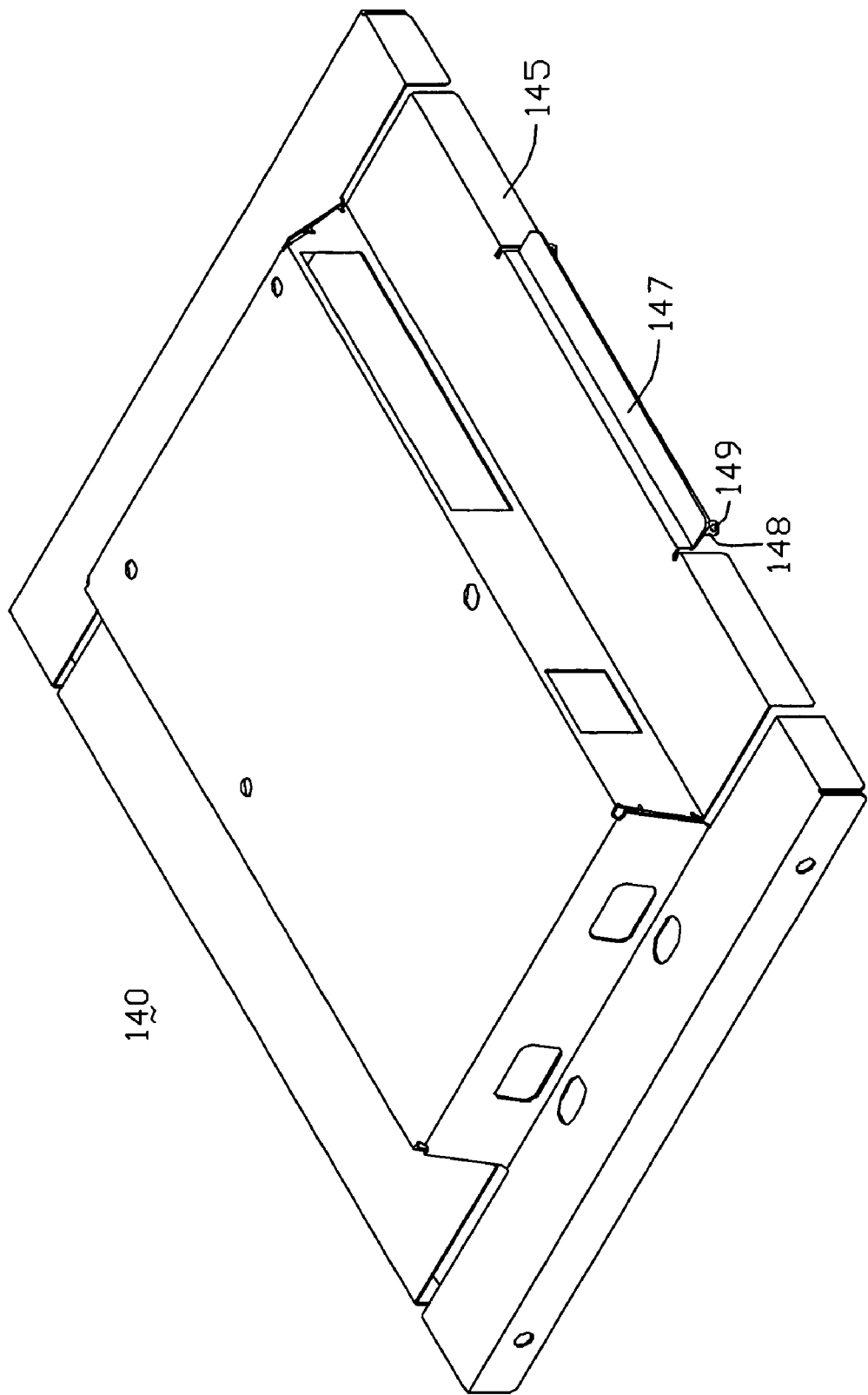
FIG. 6 is an enlarged, isometric view of the shield of FIG. 5.

Referring to FIG. 4, this shows the display panel 220 assembled with the shield 240, and having the connecting members 250 attached thereon. The connecting members 250 are attached to the bridge portions 244, and are fixed thereon by two screws (not shown) engaging in the first fixing holes 252 respectively. The shield 240 is engaged with the display panel 220, with the main body 254 and the second bending part 255 of the connecting members 250 abutting the cover 222 at the side wall 227 of the display panel 220. The shield 240 is fixed to the display panel 220 by screws (not labeled) engaging in two opposite sides thereof. The button circuit board 262 is fixed by the second end portions 256 of the connecting members 250, with the screws 224 engaging in the second fixing holes 257. Each of opposite ends of the button circuit board 262 abuts the side part 258 of the corresponding connecting member 250. In this position, the push buttons 264 at located according to the through holes 212 of the front frame 210.

When assembling the liquid crystal display 2, firstly, the main circuit board 230 is connected to the display panel 220 and received in shield 240. Then, the display panel 220 is engaged with the shield 240. Secondly, the button member 260 is attached to the connecting members 250. Then, the connecting members 250 are attached to the shield 240. Thirdly, the front and rear frames 210, 270 are engaged to each other, thereby receiving the shield 240 and the display panel 220. In this position, the push buttons 264 protrude through the through holes 212. The protrusions 214, the first ridge 216, and the second ridges 272 abut the button circuit board 262 at a top, bottom, and a back side thereof respectively. The push buttons 264 is shown in a front of the liquid crystal display 2 and provided for users to adjust the characteristics of images shown on the display panel 220.

Unlike in the above-described conventional liquid crystal display 1, the button member 260 is attached to the connecting members 250, which extend down from the shield 240. Therefore, the size of the shield 240 can be smaller than that of the display panel 220, and less material is needed for fabricating the shield 240. The connecting members 250 are electrically connected to the shield 240 and the cover 222 of the display panel 220, and thereby facilitate providing a screening effect for the circuit board 220 and the display panel 220. In addition, the button member 260 is held stably in position by the cooperative abutting of the protrusions 214 and the first and second ridges 216, 217.

While preferred and exemplary embodiments have been described above, it is to be understood that the invention is not limited thereto. To the contrary, the above description is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display, comprising:
   a display panel having a side wall;
   a shield engaged with the display panel, wherein a size of the shield is smaller than a corresponding size of the display panel;
   a connecting member, the connecting member being an elongated strip comprising a first end and a second end opposite to the first end, the first end of the connecting member attached at the shield; and
   a button circuit board attached at the second end of the connecting member, wherein the button circuit board abuts the side wall of the display panel.

2. The liquid crystal display as claimed in claim 1, wherein the shield is made of metal.

3. The liquid crystal display as claimed in claim 1, wherein the connecting member is made of metal.

4. The liquid crystal display as claimed in claim 1, further comprising a cover surrounding the display panel.

5. The liquid crystal display as claimed in claim 1, wherein the connecting member further comprises a first end portion a first bending part, a main body, a second bending part, and a second end portion, the first end portion and the first bending part are at the first end, the second end portion and the second bending part are at the second end, the first bending part is connected with the first end portion and the main body, and the second bending part is connected with the second end portion and the main body.

6. The liquid crystal display as claimed in claim 5, wherein the display panel comprises a back surface, and the main body of the connecting member abuts the back surface.

7. The liquid crystal display as claimed in claim 1, wherein the shield comprises a bridge portion, and the first end of the connecting member is attached at the bridge portion.

8. The liquid crystal display as claimed in claim 1, further comprising a front frame and a rear frame, the front frame engaged with the rear frame, the combined front frame and rear frame receiving the display panel, the shield, the connecting member, and the button circuit board therein.

9. The liquid crystal display as claimed in claim 8, wherein the button circuit board comprises a push button.

10. The liquid crystal display as claimed in claim 9, wherein the front frame comprises a through hole at a position corresponding to the push button.

11. The liquid crystal display as claimed in claim 8, wherein the front frame further comprises a ridge abutting the button circuit board.

12. The liquid crystal display as claimed in claim 8, wherein the front frame comprises a protrusion abutting the button circuit board.

13. The liquid crystal display as claimed in claim 8, wherein the rear frame comprises a ridge abutting the button circuit board.

14. The liquid crystal display as claimed in claim 1, wherein a length of the connecting member is at least twice as great as a width thereof.

15. A liquid crystal display, comprising:
- a display panel having a bottom wall;
- a shield engaged with the display panel;
- a connecting member spanning a distance between a bottom of the shield and a bottom of the display panel, the connecting member being an elongated strip and having a first end and a second end opposite to the first end, the first end attached at the bottom of the shield; and
- a button circuit board attached at the second end of the connecting member, the button circuit board abutting the bottom wall of the display panel.

16. The liquid crystal display as claimed in claim 15, wherein the connecting member comprises a first end portion, a first bending part, a main body, a second bending part, and a second end portion, the first end portion and the first bending part are at the first end, the second end portion and the second bending part are at the second end, the first bending part is connected with the first end portion and the main body, and the second bending part is connected with the second end portion and the main body.

17. The liquid crystal display as claimed in claim 16, wherein the display panel comprises a back surface, and the main body of the connecting member abuts the back surface.

18. The liquid crystal display as claimed in claim 15, further comprising a front frame and a rear frame, the front frame engaged with the rear frame, the combined front frame and rear frame receiving the display panel, the shield, the connecting member, and the button circuit board therein.

19. The liquid crystal display as claimed in claim 18, wherein the button circuit board comprises a push button.

20. A liquid crystal display comprising:
- a display panel having a side wall;
- a shield engaged with the display panel;
- a connecting member being an elongated strip, one end of the connecting member attached at the shield; and
- a button circuit board attached at an opposite end of the connecting member, the button circuit board abutting the side wall of the display panel; wherein the connecting member defines a main plate with two small plates at two opposite end regions under a condition that all of said main plate and said two small plates are parallel to one another and commonly define a continuous steps structure thereof.

* * * * *